(12) United States Patent
Rice et al.

(10) Patent No.: US 7,019,474 B2
(45) Date of Patent: Mar. 28, 2006

(54) CONSTANT CURRENT REGULATOR USING IGBT'S WITH SIMPLIFIED TIMING

(75) Inventors: David A. Rice, Syracuse, NY (US); Patrick J. Brusa, Syracuse, NY (US)

(73) Assignee: Airport Lighting Company of New York, Manlius, NY (US)

(*) Notice: Subject to any disclaimer, the term of this patent is extended or adjusted under 35 U.S.C. 154(b) by 69 days.

(21) Appl. No.: 10/818,106

(22) Filed: Apr. 5, 2004

(65) Prior Publication Data

US 2004/0189265 A1 Sep. 30, 2004

Related U.S. Application Data

(63) Continuation-in-part of application No. 10/400,339, filed on Mar. 26, 2003.

(51) Int. Cl.
*H02P 7/06* (2006.01)

(52) U.S. Cl. .......................... 318/254; 363/17

(58) Field of Classification Search ............... 363/41, 363/97, 131, 39–40, 95; 323/282, 284, 224, 323/262; 315/209 R, 224, 284, 257; 318/254, 318/258
See application file for complete search history.

(56) References Cited

U.S. PATENT DOCUMENTS 6,300,878 B1 * 10/2001 Galloway et al. ............ 340/642

* cited by examiner

*Primary Examiner*—Rajnikant B. Patel
(74) *Attorney, Agent, or Firm*—George R. McGuire; Bond, Schoeneck & King, PLLC

(57) ABSTRACT

A constant-current AC regulator comprises a switching network including two pulse-width modulator (PWM) transistors and two half-cycle transistors, a PWM transistor driver circuit, a main power transformer with two primary windings, a current sensing network, and an electronic control unit. The control unit generates a multiple pulse train signal with pulse widths based on the difference between the instantaneous load current and a predetermined design load current. The PWM transistor driver converts the pulse train signal into voltage signals appropriate for driving the PWM transformers of the switching network. The instantaneous load current is measured by the current sensing network Each set of a PWM transistor plus a half-cycle transistor carries current during a portion, e.g. half of the AC cycle. Only one primary winding is energized at any instant. Each transistor is preferably an IGBT transistor, and each pair of PWM transistor plus half-cycle transistor may comprise a dual IGBT chip. A constant current is expressed by the varying pulse widths with a high number of pulses per cycle. In one embodiment,

30 Claims, 5 Drawing Sheets

CONSTANT CURRENT REGULATOR USING IGBT'S WITH SIMPLIFIED TIMING

This application is a continuation in part of U.S. application Ser. No. 10/400,339, filed Mar. 26, 2003.

BACKGROUND OF THE INVENTION

1. Field of the Invention

The invention relates in general to AC power regulation. More particularly, the invention pertains to constant current regulators using active solid state switch devices.

2. State of the Art

Solid state insulated gate bipolar transistor (IGBT) switches capable of handling large current loads have recently become available, enabling a number of applications for pulse width modulation control which previously were impractical. Previous switching technologies for high currents were generally limited to three types of switches, one of which is the silicon control rectifier (SCR) switch, which can be turned on with a control signal but must turn off with current reversal. A power metal oxide silicon field effect transistor (MOSFET) has also been used, but tends to waste significant quantities of power because of its resistive characteristics. Bipolar transistors have also been used, but require large base currents to supply large output currents. On the other hand, the IGBT type of switch requires much less drive current and has a nearly constant saturation voltage as current increases, requiring less power consumption than the MOSFET switch, for example.

Existing constant current regulators (CCR) used for airport lighting systems have usually consisted of one of three types: saturable core regulators, resonant network regulators, and pulse width modulation (PWM) regulators. The saturable core regulators and resonant network regulators have significant efficiency and size disadvantages in comparison to PWM regulators. Two types of PWM regulators are known in the prior art, those based on silicon controlled rectifiers (SCR) and those based on IGBT.

The SCR-based regulators use silicon controlled rectifiers which are triggered partway through a 60 Hz input current cycle and remain ON until the current reverses. The width of the ON time determines the amount of current in the primary winding of the transformer and can be varied to control the output current. This approach is reasonably efficient, but has a significant drawback in that the system power factor is generally much less than the ideal 1.0, because the current always lags the voltage and the shape of the current waveform causes high levels of harmonics in the input current.

Regulators based on IGBT have overcome limitations of the SCR-based regulators by switching ON and OFF many times per cycle, usually at about 50 to about 100 times per cycle. This permits the power factor to be maintained at a high level while providing excellent controllability of the output current. The biggest drawback to IGBT-based regulators is that the arrangement of the IGBT transistors requires carefully controlled timing between the IGBT control signals. If the timing of input IGBT and catch IGBT is too close, excessive current will be dissipated by the IGBT's and the input can experience excessive momentary short circuits. On the other hand, if the timing between the input IGBT and catch IGBT is overly separated, excessive voltages can build up on the IGBT transistors, or the efficiency of current transfer from the primary winding to the secondary winding will be reduced. Furthermore, the required timing may vary as a function of temperature, current, or duty cycle, making control of this timing very difficult and possibly leading to failure of the controller.

It is therefore a primary object of the present invention to provide a constant current regulator which provides a controllable uniform current while eliminating the difficult timing constraints common to prior IGBT regulators. Another object of the invention is to provide a constant current regulator which is controllable over a wide range of load current without failure. It is a further object of the invention to provide a constant current regulator in which power dissipation is minimized. A still further object of the invention is to provide a reliable constant current regulator formed of commercially available components at low cost.

SUMMARY OF THE INVENTION

This invention comprises a constant current regulator (CCR) and circuitry thereof which provide advantages over the prior art. The constant current regulator receives an alternating current (AC) input from an electric power source and provides a substantially constant AC output current to a load. An exemplary constant current regulator in accordance with the invention includes a switching network, a transistor driver circuit, a main power transformer with two primary windings, a current sensing circuit, and an electronic control circuit.

The switching network uses an arrangement of two pulse-width modulation (PWM) transistors and two half-cycle transistors plus four diodes to drive two primary windings on the main transformer. This network permits a single pulse-width modulation (PWM) control signal to switch both PWM transistors without regard to the instantaneous AC input polarity, thereby reducing the complexity of the control system timing.

In accordance with one aspect of the invention, one of the two primary windings of the transformer is connected to the input AC at any given instant of time.

In accordance with another aspect of the invention, each primary winding of the transformer has a diode in parallel therewith. As a result, induced current caused by shut-off of the solid state switch is shunted through the diode, maintaining the current in the primary.

In accordance with another aspect of the invention, the regulator for each primary winding circuit includes two solid state IGBT switches, two diodes and a primary winding.

In accordance with another aspect of the invention, each primary winding has one solid state switch which is controlled by the pulse width modulation (PWM) control signal, and one solid state switch which is controlled by the polarity of the line input waveform. This latter switch may be controlled by an analog signal derived from the line input, or alternatively may be controlled by the electronic control circuit.

Although the solid state switches of the constant current regulator are generally indicated in this disclosure as comprising IGBT transistors, the switches may alternatively be implemented as bipolar transistors, MOSFET's or other type of high speed switch for pulse-width modulation (PWM) of the input AC signal.

In a further embodiment of the invention, the regulator circuit for each of the primary winding includes a pair of transistors to control the current applied to the gate of a half-cycle transistor. The input terminals to a second regulator circuit are reversed relative to the first regulator circuit, whereby the two regulator circuits are out of phase. In operation, each half-cycle transistor is ON for a portion of the AC cycle (hertz) and is OFF for a portion of the AC cycle. The ON and OFF portions may not be exactly one-half of the AC cycle waveform, but may vary as modulated by the two main circuits of the regulator.

In another embodiment of the invention, use is made of a transistor pair comprising two IGBT transistors contained in a commercially available dual-transistor device. One of the IGBT transistors is used as a PWM transistor and the other IGBT transistor used as a half-cycle transistor. Such dual transistor devices are commonly used for H-bridge applications, and may include anti-parallel diodes, whose action is overcome by the insertion of counter-acting diodes into the regulator circuit. Typically, a constant-current regulator of the invention is less expensive when dual-transistor IGBT devices are used instead of two single IGBT transistors.

BRIEF DESCRIPTION OF THE DRAWINGS

The features and advantages of the present invention can be more readily understood with reference to the following description and appended claims when taken in conjunction with the accompanying drawings, wherein:

DETAILED DESCRIPTION OF THE ILLUSTRATED EMBODIMENTS

Figure 1:
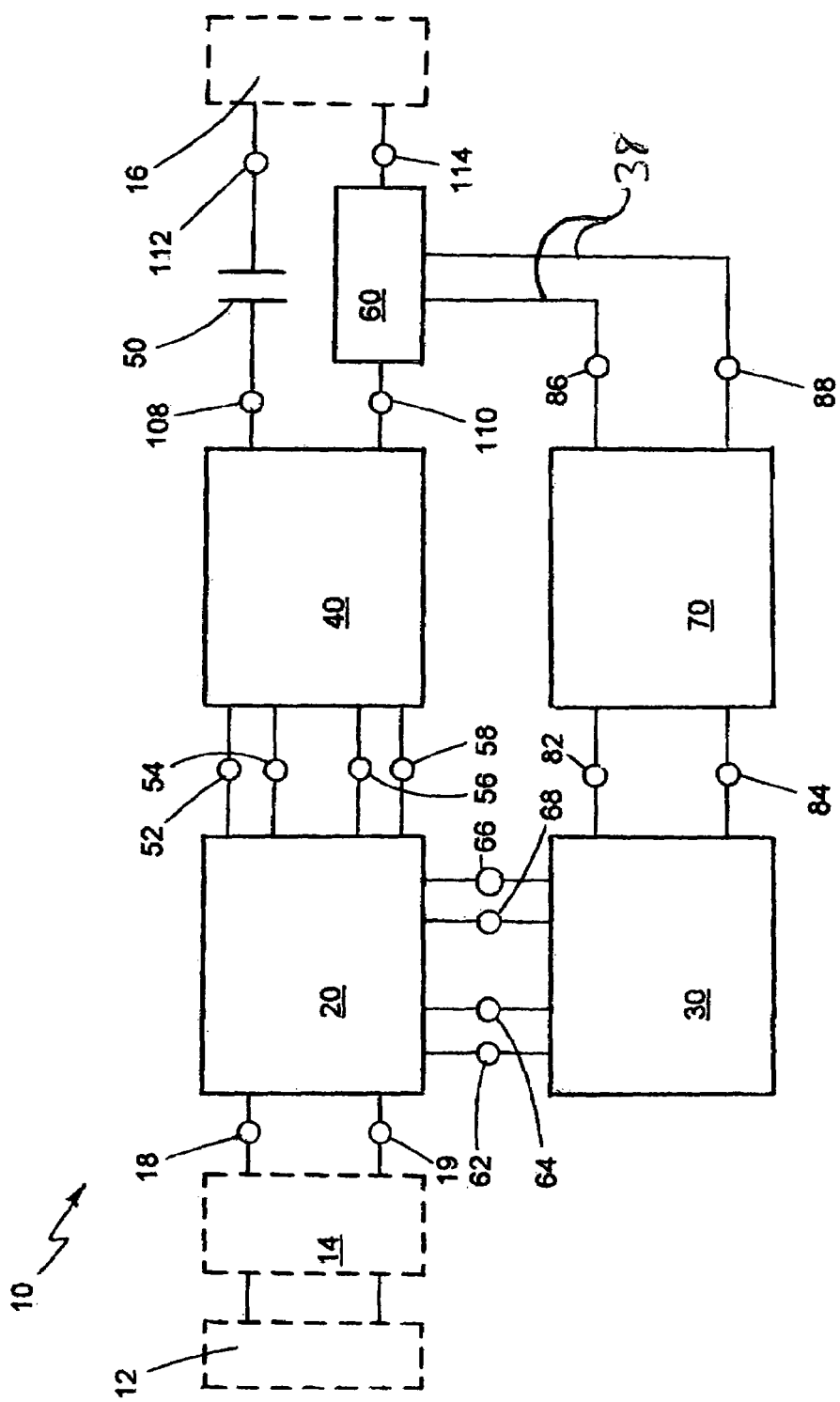
FIG. 1 is a schematic view of an exemplary constant current regulator in accordance with the present invention.

With reference now to the drawings, and in particular to FIG. 1, there is depicted a representation of a constant current regulator 10 in accordance with the invention. As shown, the constant current regulator 10 comprises a transistor power switch module 20, a transistor driver 30, a dual primary transformer 40, a capacitor 50, a current sensor 60, and a controller 70. The constant current regulator 10 is shown connected to an alternating current (AC) power source 12 through output terminals 18, 19 of a line filter 14. The line filter 14 prevents switching transient currents (from transistor power switch module 20) from being introduced to the AC source 12. The transistor power switch module 20 serves as a pulse width modulation (PWM) control to control the amount of supply current which reaches the dual primary transformer 40. The dual primary transformer 40 converts the current provided by power switch module 20 to a first primary winding through terminals 52, 54 and to a second primary winding through terminals 56, 58. The current provided by module 20 is converted by transformer 40 to current and voltage levels appropriate for a power consuming load 16. By way of example, and not limited thereby, a load 16 may be a series of isolation transformers coupled to incandescent lighting loads. Use of such an exemplary application is followed throughout the following discussion as being merely a typical use of the constant current controller 10 of the invention.

Current sensor 60 is a device which provides an output signal e.g. variable current signal across terminals 86 and 88. The current sensor output signal 38 is preferably generally proportional to the current consumed by the load 16. Current sensor 60 is preferably a current transformer, such as are known in the art.

The transformer controller 70 is a device which receives output signal 38 from the current sensor 60 and determines the current in the load 16. The controller 70 then generates a series of control pulses which modulate the duty cycle of the power switch module 20. Controller 70 may be implemented as an analog circuit that varies the pulse width of a pulse train of current by comparing the sensed current to a set current value. Controller 70 may also be implemented as a micro-controller or processor to measure the load current and vary the pulse widths of the output pulse train based on a comparison of the sensed current to a set current value.

The pulse stream from controller 70 is shown connected to the half-cycle transistor driver 30 through terminals 82, 84. The transistor driver 30 converts the low level logic signal coming from the controller 70 into isolated higher voltage switching control voltages required for the transistor power switch module 20. The transistor driver 30 may use isolated power sources 48 to supply controlling voltages to the gates of the PWM transistors 22A, 22B (see FIG. 2 and FIG. 4).

Mounting of the regulator components may vary. For example, the controller 70 and IGBT driver 30 may be mounted on a single circuit board (not shown) or they may be mounted on separate boards, depending upon space and mounting limitations.

As depicted in FIG. 1, capacitor 50 is used to shift the phase of the current to load 16 relative to the voltage in the secondary winding circuit of transformer 40 to compensate for the inductive nature of the transformer 40.

Figure 2:
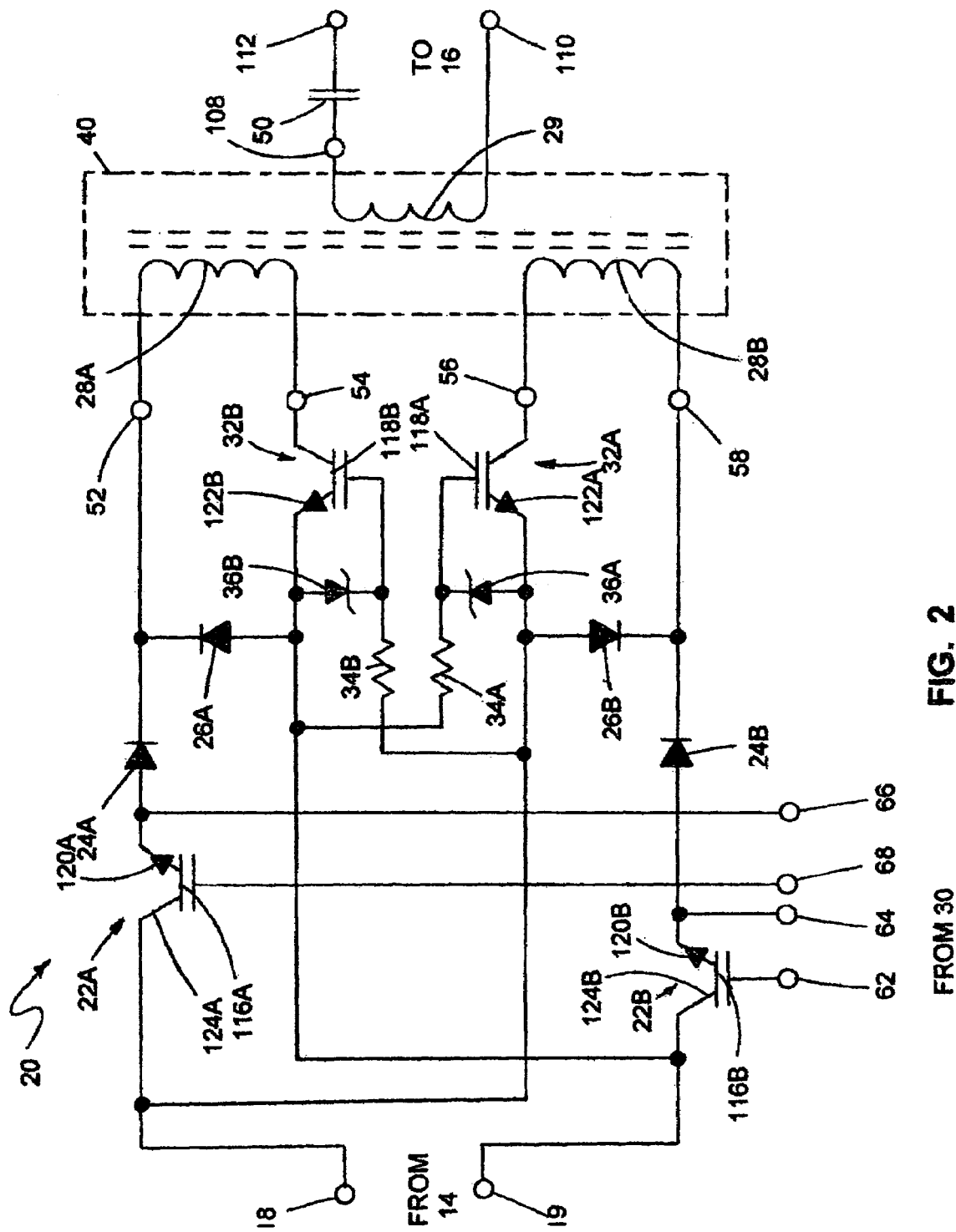
FIG. 2 is a schematic view of an IGBT power switch module and dual primary power transformer in accordance with a constant current regulator of the invention.

FIG. 2 of the drawings is a schematic diagram depicting the circuit details of the transformer power switch module 20 and the dual primary power transformer 40. The input current from line filter 14 is directed from line filter outlet terminals 18 and 19 to two pulse-width modulator (PWM) transistors 22A and 22B, respectively. Each of the PWM transistors 22A and 22B is dedicated to one-half of the AC cycle. Preferably, the PWM transistors 22A and 22B comprise Insulated Gate Bipolar Transistors (IGBT's).

Diodes 24A and 24B are included in the power switch module circuit 20 to prevent current from flowing during the "wrong" portion or "wrong" one-half of the AC cycle. Diodes 26A and 26B are used in the circuit to prevent the magnetic field from collapsing in a primary winding 28A, 28B of the transformer 40 when PWM transistors 22A and 22B are switched OFF. As shown in FIG. 2, the transformer 40 has two primary windings 28A, 28B and a single secondary winding 29. The transformer 40 may be configured to operate from two input voltages, e.g. 220 VAC and 480 VAC. In this case, the transformer 40 may include four primary windings 28 which are arranged in two sets of parallel windings for 220 VAC and two sets of series windings for 480 VAC.

The circuit of the power switch module 20 depicted in FIG. 2 operates in two modes, depending upon the instantaneous polarity of the AC input current from terminals 18 and 19. For example, let it be assumed that the polarity of the instantaneous current is such that the input terminal 18 is more positive than the input terminal 19. This condition is true for one-half of the sine wave cycle of the input. In this condition, the circuit consisting of PWM transistor 22B, half-cycle transistor 32A, diode 26B, diode 24B, and the primary winding 28B has substantially no current flowing through it, due to the action of diode 24B which is reverse-biased. Furthermore, during this one-half of the sine wave cycle, transistor 32A will be OFF, inasmuch as the gate 118A thereof will be motivated to a negative voltage via resistor 34A. Zener diode 36A limits the input voltage at the gate 118A of half-cycle transistor 32A to keep it within a safe range for the transistor. For example, for a typical IGBT with maximum gate voltage of 20V, zener diode 36A may be rated for 18 volts. This configuration will limit the positive voltage on the gate 118A of half-cycle transistor 32A to approximately 18 volts on one-half of the sine-wave cycle, and will limit the negative voltage at the gate 118A of half-cycle transistor 32A to about one volt during the other one-half of the sine-wave cycle.

In this first mode of operation, the portion of the regulator circuit including PWM transistor 22A, half-cycle transistor 32B, diode 24A and primary winding 28A will pass current whenever transistor 22A is turned ON. During this half of the AC cycle, half-cycle transistor 32B will be ON continuously for the majority of the half cycle, due to the voltage applied through resister 34B. There will be a brief period at the beginning and end of the cycle where the gate voltage of half-cycle transistor 32B will be below the threshold voltage, during which time the transistor 32B will be OFF. The gate voltage of half-cycle transistor 32B is limited by the operation of zener diode 36B in the same manner as the gate voltage of half-cycle transistor 32A is limited by the operation of zener diode 36A.

PWM transistor 22A is turned ON by raising the voltage at its base 116A to a voltage above the threshold voltage relative to the emitter 120A of PWM transistor 22A. The driver circuit 30 (FIG. 1) provides the control voltage to the transistor base 116A, relative to emitter 120A, based on logic inputs from the controller 70. When PWM transistor 22A is turned ON, current is applied through diode 24A and half-cycle transistor 32B to primary winding 28B, inducing a current in the secondary winding 29. When PWM transistor 22A is switched OFF, the collapsing magnetic field in the primary winding 28B begins to induce a voltage of polarity opposite to the previously applied voltage at the terminals 56, 58 of the winding 28A. Once diode 26A becomes forwardly biased by this induced voltage, it begins conducting, thus preventing the magnetic field in the primary winding 28A from collapsing. This switching between ON and OFF positions is repeated many times per cycle wherein the width and frequency of the ON pulses affects the total quantity of current which is induced in the secondary winding 29 of the transformer 40.

The magnetic field in the primary winding 28A causes the induction of a current in both the secondary winding 29 and the opposite primary winding 28B. The current in the secondary winding 29 is applied through capacitor 50 and terminals 112, 114 to the load 16. In this example, current induced in the primary winding 28B by primary winding 28A is not desired, because current in primary winding 28B will be shunted through half-cycle transistor 32A and diode 26B, resulting in excessive current draw by the primary winding 28B. Thus, there is a waste of current. The problem is resolved by combining resistor 34A and zener diode 36A together with half-cycle transistor 32A in the circuit. Half-cycle transistor 32A effectively opens the primary winding circuit 28B while the primary winding circuit 28A is being driven. Likewise, half-cycle transistor 32B, zener diode 36B and resistor 34B operate in the same manner and perform a similar function for opening the primary winding circuit 28A while primary winding circuit 28B is being driven.

A second mode of operation of the power switch module 20 occurs when the polarity at input terminal 18 is negative with respect to input terminal 19. In this mode, the portion of the circuit which includes PWM transistor 22A, half-cycle transistor 32B, diode 24A, diode 26A and primary winding 28A has no current flowing through it, because half-cycle transistor 32B is substantially not conducting current. The other portion, e.g. one-half of the circuit including PWM transistor 22B, half-cycle transistor 32A, diode 24B, diode 26B and primary winding 28B operates in the same manner for the negative portion e.g. half of the AC cycle as described above for the first portion e.g. one-half of the circuit on the positive portion e.g. one-half of the AC cycle. It should be noted that the references herein to a half cycle may include instances when the positive and negative cycle portions are not necessarily exactly one-half in terms of time, but may vary depending upon the modulation characteristics of the regulator 10, and the reactance of load 16.

As described above, the supply of power for the transformer 40 is controlled by a different portion of the power switch module 20 for each "half-cycle" of the input waveform. In each half-cycle, one transformer winding 28A or 28B is energized using a Pulse Width Modulator (PWM) control signal to control the rate of current flow induced in the secondary transformer winding 29 for that half-cycle. Inasmuch as current is applied in one direction in each primary winding 28A, 29A, the diode 26A or 26B across each winding will hold the magnetic field during the OFF times of PWM transistor 22A or 22B, allowing power to be transferred consistently to the secondary winding 29.

Furthermore, inasmuch as diodes 24A and 24B prevent current flow during the one-half portion of the AC cycle when the PWM transistor 22A or 22B is not switching, both transistors 22A, 22B can be controlled by a single pulse-width signal, and additional synchronization of timing is not required. This makes it possible to control the entire power switch module 20 using a simple micro-controller or even an oscillator.

Preferably, half-cycle transistors 32A and 32B comprise insulated gate bipolar transistors (IGBT).

In the circuit shown in FIG. 2, the emitter 122B of half-cycle transistor 32B is connected to the collector 124B of PWM transistor 22B, and this pair of transistors 32B, 22B may be implemented using a single transistor package having dual insulated gate bipolar (IGBT) transistors, such as are readily available for H-bridge applications.

Likewise, the emitter 122A of half-cycle transistor 32A is connected to the collector 124A of PWM transistor 22A, and a single transistor package of dual IGBT transistors may be conveniently used to encompass both transistors. Such dual IGBT transistor packages are typically of lower cost than single IGBT transistor packages. The inclusion of diodes 24A and 24B in the primary winding circuits eliminate problems which may arise when a dual IGBT package having anti-parallel diodes is used. Such anti-parallel diodes are often included in inexpensive commercial dual-IGBT silicon packages and must be compensated for by diodes 24A, 24B in the present invention.

Figure 3:
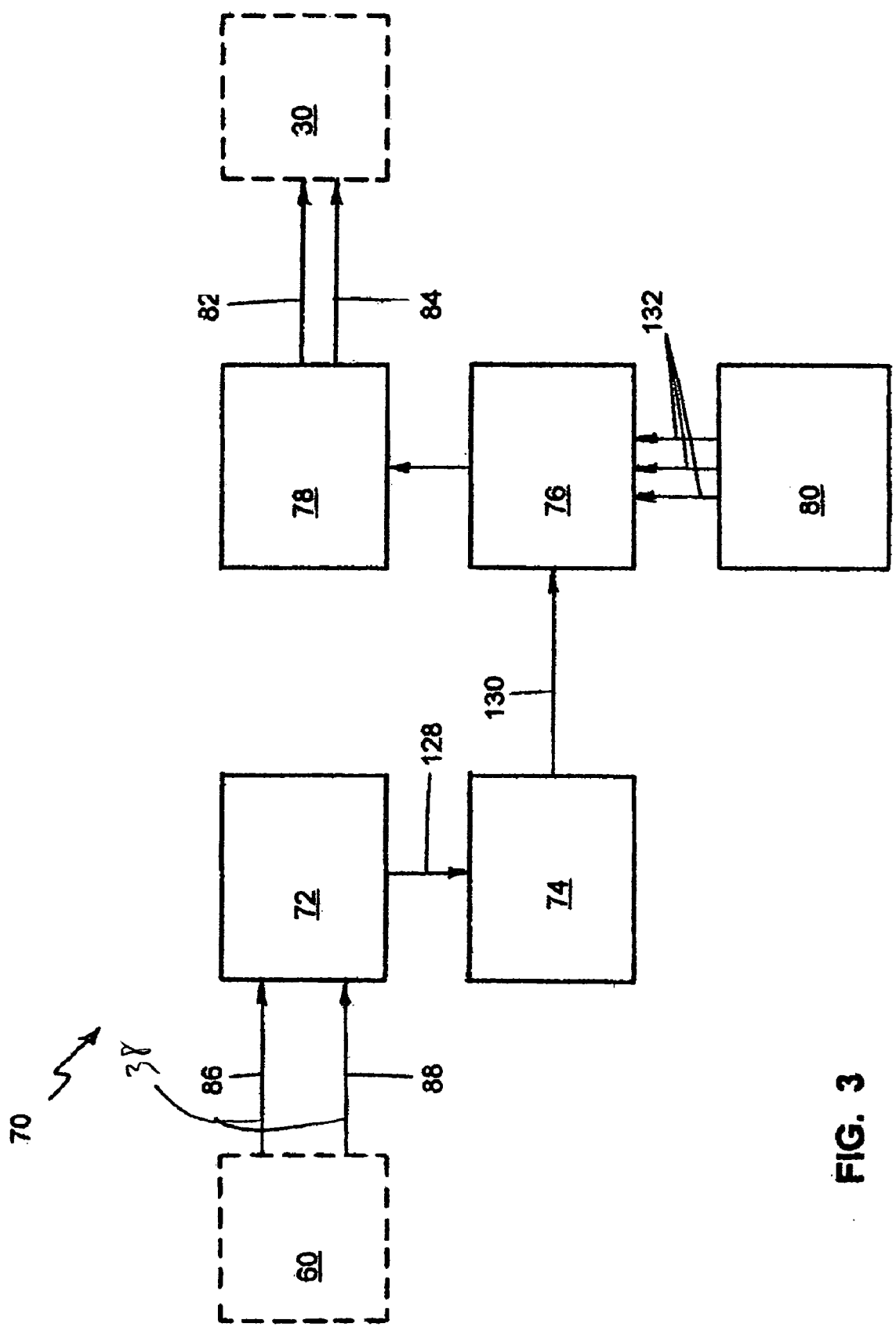
FIG. 3 is a schematic view of a controller for a constant current regulator in accordance with the invention.

Turning now to FIG. 3, there is depicted a block diagram of a preferred embodiment of controller 70 of the invention. The controller 70 includes trans-impedance amplifier 72 which receives a current signal 38 from current sensor 60 through terminals 86 and 88. This current signal 38 is proportional to the output current from the transformer 40. The trans-impedance amplifier 72 converts this current signal 38 to an output voltage signal 128 that is proportional to the output current from transformer 40. The output signal 128 from the trans-impedance amplifier 72 is directed to an analog-to-digital (A-D) converter 74, which periodically samples voltage output signal 128 and creates a digital representation 130 of this voltage. The output 130 of converter 74 is connected to a micro-controller 76 which may be a conventional micro-controller or digital signal processor. Micro-controller 76 compares the voltage at the transimpedance amplifier 72 to a stored representation of a sine wave scaled by an amplitude that represents the desired peak amplitude of the output current from transformer 40 to the load 16. The micro-controller 76 then modifies the pulse-width setting of pulse-width modulator 78 to increase or decrease the measured output current from transformer 40 to make it match the desired waveform. If the load 16 remains constant and the output voltage of the transformer 40 remains constant, increasing the time during which current pulses turn ON the half-cycle transistors 32A and 32B will increase the output current of the transformer 40 through terminals 112, 114. Decreasing the time during which current pulses turn ON the half-cycle transistors 32A and 32B will decrease the output current of transformer 40 through terminals 112, 114.

Control interface 80 may comprise any of a control panel, buttons, switches, another computer or a communications link to another controllable device. Control interface 80 is effective for generating control signals 132 to modify the operating parameters of micro-controller 76 and thus control the current to the load 16.

Figure 4:
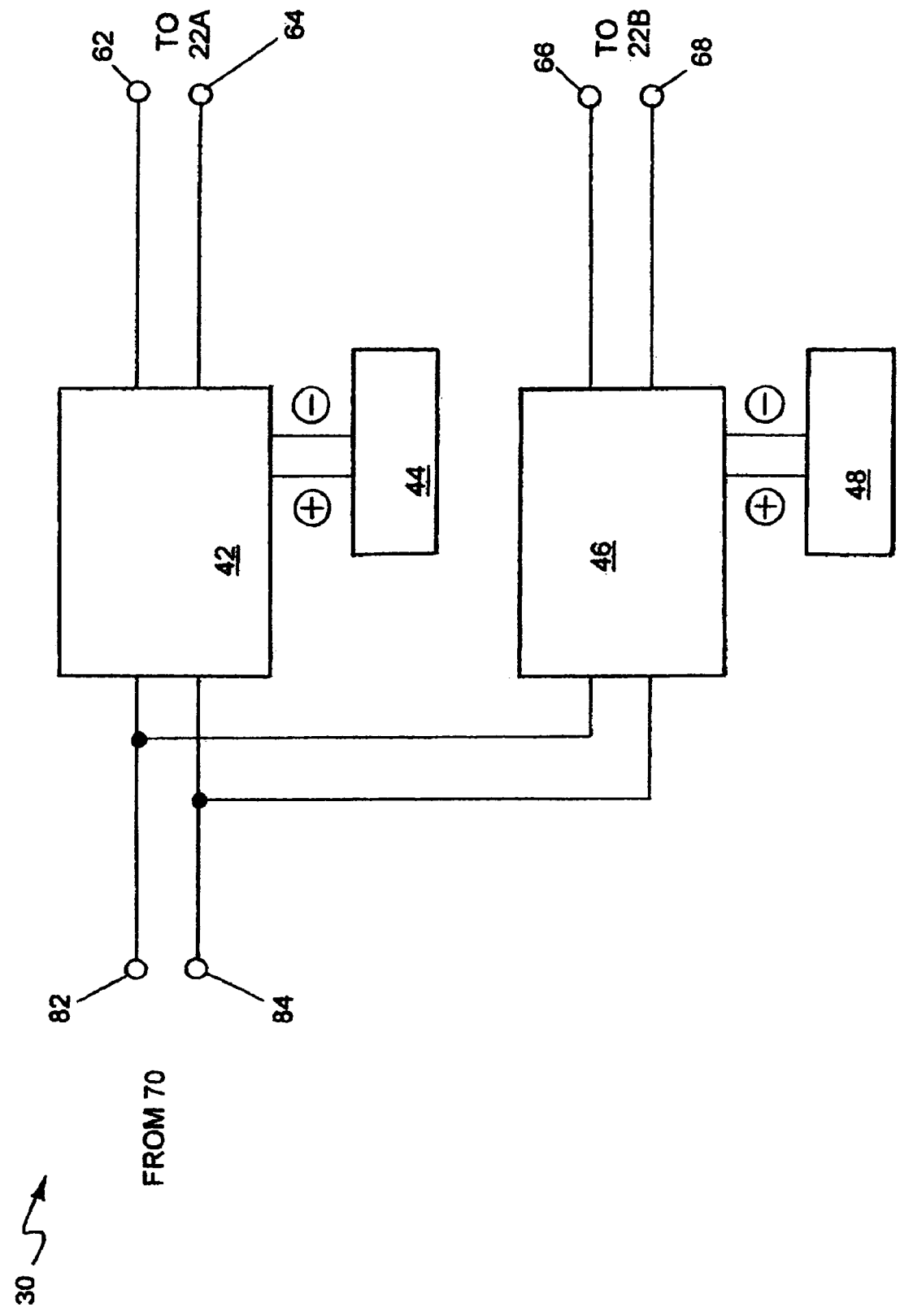
FIG. 4 is a schematic view of an IGBT driver for a constant current regulator in accordance with the invention.

With reference now to FIG. 4, a block diagram of a preferred embodiment of driver circuit 30 is depicted. Driver 30 is shown as consisting of two isolated power supplies 44 and 48 that deliver a positive voltage and negative voltage to optical isolator devices 42 and 46. In one embodiment, where the IGBTs have a threshold voltage of 5V, the isolated power supplies 44, 48 provide approximately +15 volts and −15 volts to the optical isolator devices 42 and 46. The optical isolator devices 42 and 46 convert the digital PWM input signal into positive and negative gate voltages to control the PWM transistors 22A and 22B, respectively, through terminals 62, 64 and 66, 68, respectively.

Figure 5:
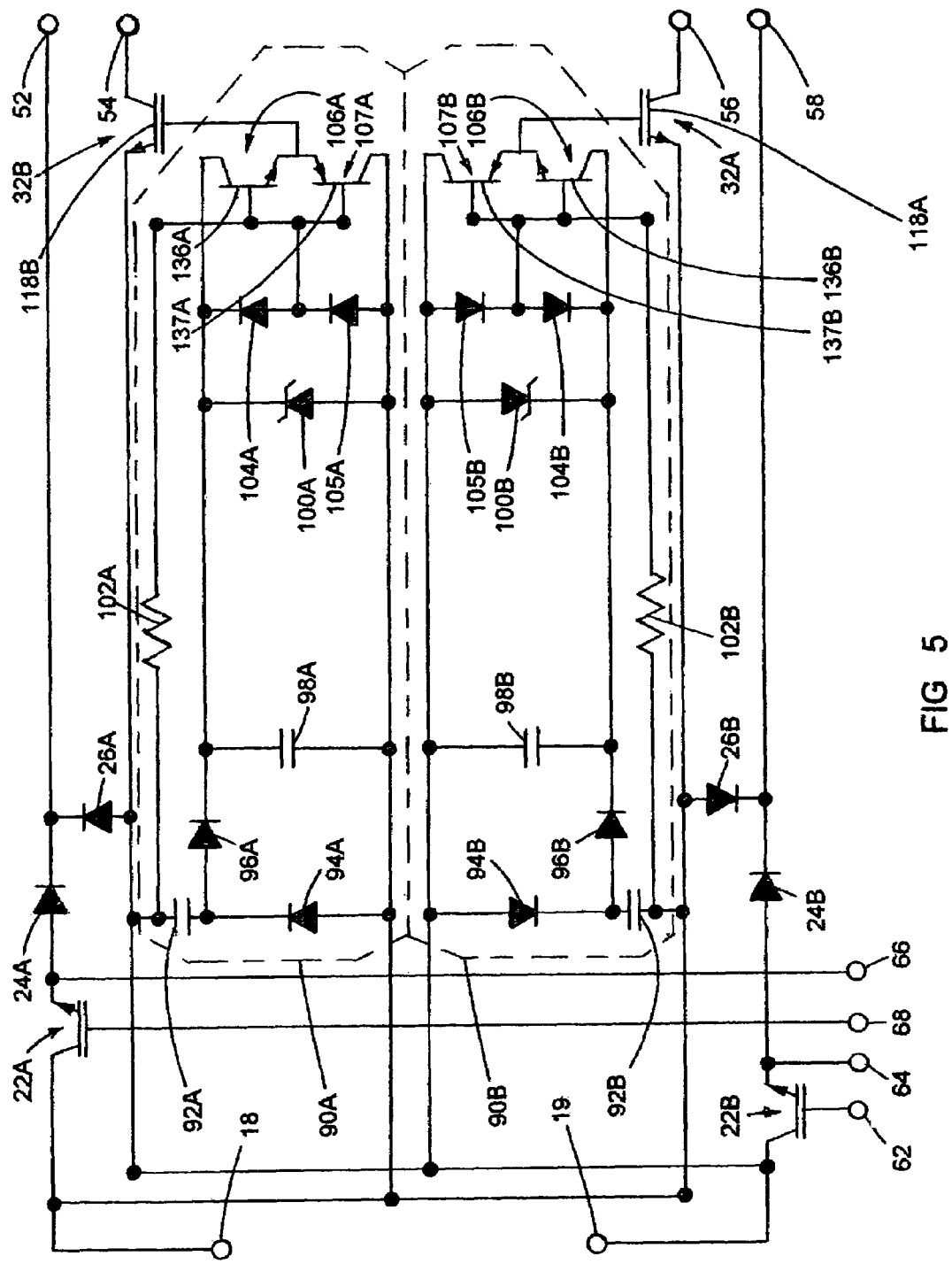
FIG. 5 is a schematic view of an alternative driver circuit for a constant current regulator in accordance with the invention.

Turning now to FIG. 5, a schematic diagram of an exemplary circuit of an alternative half-cycle power switch module 20A is shown, whereby half-cycle transistors 32A and 32B may be driven more efficiently by an alternative driving circuits 90B and 90A, respectively, which are mirror images of each other. The resistor 34A and zener diode 36A of the circuit in FIG. 2 are replaced by alternative circuit 90B, and the resistor 34B and zener diode 36B are replaced by alternative circuit 90A. In the circuit of FIG. 2, it can be seen that resistors 34A and 34B draw current throughout the AC input cycle, resulting in waste of power and contributing to unnecessary heating in the regulator 10.

The alternative power switch module 20A shown in FIG. 5 draws less root-mean-square (RMS) power than the embodiment of FIG. 2, by using a transistor pair, i.e. NPN transistor 106B and PNP transistor 107B to control the voltage applied to the gate (base) 118B of half-cycle transistor 32B. Likewise, a transistor pair i.e. NPN transistor 106A and PNP transistor 107A is used to control the voltage applied to the gate (base) 118A of half-cycle transistor 32A. In each case, the transistor pair is arranged as complementary emitter followers. This pair of alternative driver circuits 90A, 90B will always be out of phase with each other during operation of the regulator 10.

As shown in FIG. 5, each of the driver circuits 90A and 90B is connected to terminals 18 and 19 of an input filter 14 (see FIG. 1). Referring again to FIG. 5, terminal 19 carries an AC voltage opposite in phase to the voltage of terminal 18. In driver circuit 90A, the AC voltage across terminals 18 and 19 is used to develop a first DC voltage to drive gate 118B of half-cycle transistor 32B. The first DC voltage is developed across capacitor 98A by the action of capacitor 92A, diodes 94A and 96A, and zener diode 36B. Likewise, a second DC voltage is developed in drive circuit 90B to drive gate 118A of half-cycle transistor 32A, wherein the second DC voltage is developed across capacitor 98B by the action of capacitor 92B, diodes 94B and 96B, and zener diode 36A.

As the voltage applied at a first input terminal 18 becomes positive relative to terminal 19, capacitor 92A delivers current through diode 96A into capacitor 98A, causing capacitor 98A to become charged. Whenever the voltage across capacitor 98A attains the breakdown voltage of zener diode 100A, the capacitor 98A stops charging and additional current from capacitor 92A is shunted through zener diode 100A back to the second input terminal 19. When the voltage applied to input terminal 18 begins to decrease, diode 96A becomes reverse-biased and stops conducting. When the voltage at terminal 18 drops more than a given value (about 12 volts in the preferred embodiment) below its peak voltage value, diode 94A will begin to conduct. This conduction in diode 94A initially discharges capacitor 92A, and then charges capacitor 92A in the opposite polarity. When the voltage at first input terminal 18 attains its negative peak voltage and begins to reverse again, diode 94A becomes reverse-biased. When the voltage at terminal 18 reaches a given value (about +12 volts in the preferred embodiment) above its peak negative voltage, diode 96A once again becomes forward-biased and current once again flows through capacitor 92A, through diode 96A and into capacitor 98A and zener diode 10A. Capacitance values of capacitors 92A and 98A are selected to maintain a relatively constant DC voltage across capacitor 98A.

The remainder of circuit 90A in FIG. 5 controls the voltage applied to the gate 118B of half-cycle transistor 32B. Transistors 106A and 107A are arranged as complementary emitter followers. The base voltage applied to transistors 106A and 107A is clamped to maintain it within an appropriate working voltage range. For the preferred embodiment cited above, the working voltage range may be from about −0.5 volts to about +12 volts. Diode 104A will conduct if the voltage at the bases 136A and 137A of transistors 106A and 107A reaches a given value, which is approximately +12.5 volts in the preferred embodiment. Thus, at this point in the operation, excess current will be shunted through diode 104A and zener diode 100A to maintain the base voltage to bases 136A and 137A at approximately +12.5 volts. When the base voltage to bases 136A and 137A drops to approximately −0.5 volts, diode 105A will conduct, shunting current to the input terminal 19, thereby maintaining the base voltage at approximately −0.5 volts. Resistor 102A has a relatively high resistance value, and will provide a sample of the voltage at input terminal 18 to bases 136A and 137A of transistors 106A, 107A. Whenever the voltage at input terminal 18 is more negative than approximately −0.5 volts, resistor 102A will pull the bases 136A, 137A to approximately −0.5 volts. Whenever the voltage at input terminal 18 is between approximately −0.5 volts and approximately 12 volts, the base voltages at bases 136A and 137A will be approximately equal to the voltage at input terminal 18.

Whenever the voltage at input terminal 18 exceeds approximately +12.5 volts, the base voltage at bases 136A, 137A will be drawn to about +12.5 volts by resistor 102A. The action of the two transistors 106A and 107A will be to apply a voltage to the base 118B of half-cycle transistor 32B.

This applied voltage is approximately equal to the voltage applied to bases 136A and 137A, but having a lower impedance due to current amplification characteristics of the two transistors 106A, 107A. This output voltage will charge and discharge the gate capacitance of the half-cycle transistor 32B to turn transistor 32B ON for the positive portion, e.g. one-half, of the cycle and OFF for the negative portion e.g. one-half, of the cycle.

As depicted in FIG. 5, circuit 90B has the same configuration as circuit 90A, and acts to drive half-cycle transistor 32A through its gate 118A. Circuit 90B comprises capacitors 92B and 98B, resistor 102B, diodes 94B, 96B, 104B, 105B, zener diode 100B and transistors 106B, 107B through their gates 136B, 137B. In contrast to circuit 90A, the connections of circuit 90B to input terminals 18 and 19 are reversed to maintain the gate 118A of half-cycle transistor 32A out of phase with respect to gate 118B of half-cycle transistor 32B.

In a preferred embodiment of circuits 90A and 90B, capacitors 92A, 92B, 98A and 98B have a capacitance of about 0.1 µF, and the resistance of each resistor 102A, 102B is approximately 1 megOhm. With these values, the drive circuit 90A, 90B of FIG. 5 will dissipate less than about ¼ watt in a 480 volt AC system. By comparison, the zener diode drive circuit of FIG. 2 will dissipate approximately 40 watts. Preferably, the half-cycle transistors comprise insulated gate bipolar transistors (IGBT's).

The instant invention has been described above in detail with reference to certain preferred embodiments. It is appreciated that the invention is not limited to the specific indicated embodiments. Rather, in view of the present disclosure which describes the best mode of the invention, many modifications and variations may be evident to those of skill in the art without departing from the scope and spirit of the invention as defined in the following claims.

What is claimed is:

1. A constant current regulator, comprising:
    a transformer having first and second primary windings and at least one secondary winding;
    a transistor power switch module, comprising:
        a first pulse-width modulator (PWM) transistor for receiving current from an AC power source and forming a train of current pulses over a first portion of an AC cycle in response to a controlled pulsed gate voltage signal;
        a second pulse-width modulator (PWM) transistor for receiving current from said AC power source and forming a train of current pulses over a second portion of said AC cycle in response to a controlled pulsed gate voltage signal;
        a first half-cycle transistor for receiving said current pulses from said first PWM transistor and supplying modified current pulses to said first primary winding;
        a second half-cycle transistor for receiving said current pulses from said second PWM transistor and supplying modified current pulses to said second primary winding;
    a driver circuit for alternatingly providing pulsed gate voltages to said first and second PWM transistors for driving thereof on differing portions of said AC cycle;
    wherein the pulse widths of said current pulses from said first and second half-cycle transistors are controlled to provide a uniform current to a power-consuming load.

2. A constant-current regulator in accordance with claim 1, further comprising a current sensing circuit providing means for measuring the actual value of current to said load and providing a signal indicative thereof.

3. A constant-current regulator in accordance with claim 2, wherein said current sensing circuit comprises a current transformer.

4. A constant-current regulator in accordance with claim 2, further comprising an electronic control circuit for receiving said signal from said current sensing circuit, comparing said actual current value with a predetermined design value, and generating a series of control pulses having pulse widths for achieving said design value of load current.

5. A constant-current regulator in accordance with claim 4, wherein said electronic control circuit comprises an analog circuit.

6. A constant-current regulator in accordance with claim 4, wherein said electronic control circuit comprises a computerized processor for generating a series of control pulses having pulse widths for achieving said design value of load current.

7. A constant-current regulator in accordance with claim 1, further comprising a filter for removing transient voltages from said input power source.

8. A constant-current regulator in accordance with claim 1, wherein only one of said first and second PWM transistors will pass significant current at any instant of time.

9. A constant-current regulator in accordance with claim 1, further comprising a diode in line with each said PWM transistor to ensure that current is transmitted only when the gate of each said PWM transistor is driven to produce a current.

10. A constant-current regulator in accordance with claim 1, further comprising a diode parallel to each said primary winding for shunting current induced by shutoff of a half-cycle transistor to said input.

11. A constant-current regulator in accordance with claim 1, wherein the frequency of pulses in said pulse train comprises at least 20 per AC cycle.

12. A constant-current regulator in accordance with claim 1, wherein the frequency of pulses in said pulse train comprises at least 50 per AC cycle.

13. A constant-current regulator in accordance with claim 1, wherein said first and second half-cycle transistors are always out of phase relative to each other.

14. A constant-current regulator in accordance with claim 1, wherein said current train from said second half-cycle transistor is always opposite in polarity to said current train from said first half-cycle transistor.

15. A constant-current regulator in accordance with claim 1, wherein said portion of said AC cycle comprises approximately one-half of said cycle.

16. A constant-current regulator in accordance with claim 1, further comprising a capacitor following said secondary transformer winding for shifting the phase of current relative to voltage to said load.

17. A constant-current regulator for receiving current from an AC power source and providing a constant current to a load, comprising:
    a transformer, comprising:
        first and second primary windings, each said winding having two terminals; and at least one secondary winding;
    a switching circuit for supplying power to said first primary winding, comprising:
    a first pulse-width modulation (PWM) transistor comprising:
        a collector connected to a first terminal of said AC power source;

an emitter connected to a first terminal of said first
primary winding and to a driver circuit; and
a gate connected to said driver circuit;
a diode mounted in-line between said first PWM transistor
emitter and the first terminal of said first primary
winding;
a first half-cycle transistor comprising:
an emitter connected to a second terminal of said AC
power source;
a collector connected to the second terminal of said first
primary winding; and
a gate connected through a resistor to said first terminal
of said AC power source;
a diode connecting said emitter of said first half-cycle
transistor to said first terminal of said first primary
winding;
a zener diode connecting said emitter and said gate of said
first half-cycle transistor;
a switching circuit for supplying power to said second
primary winding, comprising:
a second PWM transistor comprising:
a collector connected to a second terminal of said AC
power source;
an emitter connected to a first terminal of said second
primary winding
and to said driver circuit; and
a gate connected to said driver circuit;
a diode mounted in-line between said second PWM
transistor emitter and the first terminal of said second
primary winding;
a second half-cycle transistor comprising:
an emitter connected to said first terminal of said AC
power source; a
collector connected to the second terminal of said
second primary winding; and
a gate connected through a resistor to said second
terminal of said AC power source;
a diode connecting said emitter of said second half-cycle
transistor to said first terminal of said second primary
winding;
a zener diode connecting said emitter and said gate of said
second half-cycle transistor; and
a driver circuit connected to each of said gate and emitter
of said first and second PWM transistors for generating
a current pulse train therein having controllable pulse
widths.

18. A constant current regulator in accordance with claim 17, wherein said transistors comprise high speed switch transistors.

19. A constant current regulator in accordance with claim 17, wherein said transistors comprise at least one of insulated gate bipolar transistors (IGBT), metal oxide field effect transistors (MOSFET), and bipolar transistors.

20. A constant current regulator in accordance with claim 17, wherein a PWM transistor and a half-cycle transistor of a switching circuit comprise a single device containing dual IGBT transistors.

21. A constant current regulator in accordance with claim 17, further comprising:
means for measuring the current value drawn by said load;
means for comparing said measured current value with a predetermined design value for said load;
means for generating a signal comprising a train of pulsed voltages for driving the gates of said first and second PWM transistors to achieve said predetermined design value of current.

22. A constant current regulator in accordance with claim 17, further comprising a capacitor in line with said secondary transformer winding.

23. A constant-current regulator for receiving current from an AC power source and providing a constant current to a load, comprising:
a transformer, comprising:
first and second primary windings, each said winding having two terminals; and
at least one secondary winding;
a switching circuit for supplying power to said first primary winding, comprising:
a first pulse-width modulation (PWM) transistor comprising:
a collector connected to a first terminal of said AC power source;
an emitter connected to a first terminal of said first primary winding and to a driver circuit; and
a gate connected to said driver circuit;
a first diode mounted in-line between said first PWM transistor emitter and the first terminal of said first primary winding;
a first half-cycle transistor comprising:
an emitter connected to a second terminal of said AC power source;
a collector connected to the second terminal of said first primary winding; and
a gate;
a second diode having a cathode connected to said emitter of said first half-cycle transistor and an anode connected to said first terminal of said first primary winding;
a third diode having an anode connected to said first terminal of said AC power supply, and a cathode;
a fourth diode having an anode connected to said cathode of said third diode, and a cathode;
a first resistor having a first terminal connected to said second terminal of said AC power supply, and a second terminal;
a first capacitor including:
a first side connected to said second terminal of said AC power source; and
a second side connected to said cathode of said third diode and to said cathode of said fourth diode;
a first NPN transistor and a first PNP transistor, wherein:
the emitter of said first NPN transistor is connected to the emitter of said first PNP transistor in complementary relationship;
the emitters of said first PNP and said first NPN transistors are connected to said gate of said first half-cycle transistor;
the collector of said first NPN transistor is connected to said cathode of said fourth diode;
the collector of said first PNP transistor is connected to said first terminal of said AC power source;
the gates of said first NPN transistor and first PNP transistor are connected to said second terminal of said first resistor;
a second capacitor having:
a first side connected to the collector of said first NPN transistor; and
a second side connected to the collector of said first PNP transistor;
a fifth diode having:
a cathode connected to said collector of said first NPN transistor; and an anode connected to said gates of said first NPN and first PNP transistors;
a sixth diode having:
an anode connected to said collector of said first PNP transistor; and
a cathode connected to said gates of said first NPN and first PNP transistors; and
a first zener diode having:
a cathode connected to said collector of said first NPN transistor; and
an anode connected to said collector of said first PNP transistor;
a switching circuit for supplying power to said second primary winding, comprising:
a second pulse-width modulation (PWM) transistor comprising:
a collector connected to said second terminal of said AC power source; an emitter connected to a second terminal of said second primary winding and to a driver circuit; and
a gate connected to said driver circuit;
a seventh diode mounted in-line between said second PWM transistor emitter and said second terminal of said second primary winding;
a second half-cycle transistor comprising:
an emitter connected to said first terminal of said AC power source;
a collector connected to the first terminal of said second primary winding; and
a gate;
an eighth diode having an anode connected to said emitter of said second half cycle transistor and a cathode connected to said second terminal of said second primary winding;
a ninth diode having an anode connected to said second terminal of said AC power supply, and a cathode;
a tenth diode having an anode connected to said cathode of said ninth diode, and a cathode;
a second resistor having a first terminal connected to said first terminal of said AC power supply, and a second terminal;
a third capacitor including:
a first side connected to said first terminal of said AC power source; and
a second side connected to said cathode of said ninth diode and to said anode of said tenth diode;
a second NPN transistor and a second PNP transistor, wherein:
the emitter of said second NPN transistor is connected to the emitter of said second PNP transistor in complementary relationship;
the emitters of said second PNP and said second NPN transistors are connected to said gate of said second half-cycle transistor;
the collector of said second NPN transistor is connected to said cathode of said tenth diode;
the collector of said second PNP transistor is connected to said second terminal of said power source;

the gates of said second NPN transistor and said second PNP transistor are connected to said second terminal of said second resistor;
a fourth capacitor having:
a first side connected to said collector of said second NPN transistor; and
a second side connected to said second terminal of said AC power source:
an eleventh diode having:
a cathode connected to said collector of said second NPN transistor; and
an anode connected to said gates of said second NPN and said second PNP transistors;
a twelfth diode having:
an anode connected to said collector of said second PNP transistor; and
a cathode connected to said gates of said second NPN and second PNP transistors; and
a second zener diode having:
a cathode connected to said collector of said second NPN transistor; and
an anode connected to said collector of said second PNP transistor.

24. A constant current regulator in accordance with claim 23, wherein said half-cycle transistors comprise high speed switch transistors.

25. A constant current regulator in accordance with claim 23, wherein said PWM transistors and half-cycle transistors comprise at least one of insulated gate bipolar transistors (IGBT), metal oxide field effect transistors (MOSFET), and bipolar transistors.

26. A constant current regulator in accordance with claim 23, wherein both transistors of each said switching circuit comprise a single device containing dual IGBT transistors.

27. A constant current regulator in accordance with claim 23, wherein the DC voltage applied at the gates of said half-cycle transistors is approximately 8–20 volts.

28. A constant current regulator in accordance with claim 23, wherein the DC voltage applied at the gates of said half-cycle transistors is approximately 12 volts.

29. A constant current regulator in accordance with claim 23, further comprising:
means for measuring the current value drawn by said load;
means for comparing said measured current value with a predetermined design value for said load;
driving circuit means for generating a signal comprising a train of pulsed voltages for driving the gates of said first and second PWM transistors to achieve said predetermined design value of current.

30. A constant current regulator in accordance with claim 23, wherein said capacitors are rated at about 0.1 J.1F and said resistor resistance is about 1 megohm.

* * * * *